United States Patent [19]
Ridley et al.

[11] Patent Number: 5,655,837
[45] Date of Patent: Aug. 12, 1997

[54] RADIATION THERMOMETERS

[75] Inventors: Ian Hamilton Ridley, Sheffield, England; Peter Fearnehough, Sheffield, United Kingdom

[73] Assignee: Land Instruments International Limited, Dronfield, Great Britain

[21] Appl. No.: 460,271

[22] Filed: Jun. 2, 1995

[30] Foreign Application Priority Data

Jun. 3, 1994 [GB] United Kingdom ................ 9411160

[51] Int. Cl.$^6$ ......................... G01K 1/00; G01J 5/02
[52] U.S. Cl. ............... 374/121; 374/208; 174/50; 220/3.2
[58] Field of Search ................ 374/208, 121; 174/50; 220/3.2

[56] References Cited

U.S. PATENT DOCUMENTS

| | | | |
|---|---|---|---|
| 2,142,677 | 1/1939 | Parker | 374/208 |
| 4,772,132 | 9/1988 | Hofmann | 374/208 |
| 4,958,938 | 9/1990 | Schwartz et al. | 374/208 |
| 5,024,622 | 6/1991 | Ide | 374/208 |
| 5,037,488 | 8/1991 | Wienand | 374/208 |
| 5,239,129 | 8/1993 | Ehrenfels | 174/50 |
| 5,242,226 | 9/1993 | Ross et al. | 374/208 |
| 5,243,130 | 9/1993 | Kitagawa | 174/50 |
| 5,302,027 | 4/1994 | Park | 374/139 |
| 5,323,005 | 6/1994 | Merkel | 374/121 |
| 5,568,362 | 10/1996 | Hansson | 174/50 |

FOREIGN PATENT DOCUMENTS

| | | |
|---|---|---|
| 968181 | 5/1975 | Canada . |
| 0 588 742 | 3/1994 | European Pat. Off. . |
| 2 148 029 | 3/1973 | France . |
| 406105432 | 4/1994 | Japan .................. 174/50 |
| 2 251 304 | 7/1992 | United Kingdom . |
| WO 92 20992 | 11/1992 | WIPO . |

OTHER PUBLICATIONS

Ultrakust Electronic GmbH., Data Sheet for Type R20 Stationary Radiation Sensor, Jun. 1988.
Gebrauchsanleitung Strahlungsfuhler Typ R2X, Data Sheet, Oct. 1989 (English Translation).
Patent Abstracts of Japan, abstract & JP 60-144627 published Jul. 31, 1985 [vol. 9, No. 314 (P-412) (2037) Dec. 10, 1985].

*Primary Examiner*—Diego F. F. Gutierrez
*Attorney, Agent, or Firm*—Sterne, Kessler, Goldstein & Fox, P.L.L.C.

[57] ABSTRACT

A radiation thermometer assembly comprises a radiation thermometer for detecting radiation and for generating at a first terminal an electrical output signal representative of the detected radiation. A cap assembly comprises a housing carrying a second terminal to which a cable can be connected, and electrical connectors to electrically couple the first and second terminals. An overcenter latch removably secures the cap assembly to the radiation thermometer.

11 Claims, 1 Drawing Sheet

RADIATION THERMOMETERS

FIELD OF THE INVENTION

The invention relates to radiation thermometers, for example infrared thermometers.

DESCRIPTION OF THE PRIOR ART

A problem which can arise with radiation thermometers is that of connecting remote processing electronics to the radiation thermometer. Conventionally, a cable which is to link the radiation thermometer to a remote processor has to be inserted into a cap which fits to the thermometer, the cable being threaded through a gland and then attached to a terminal on the thermometer. This type of connection is often difficult to perform in the rugged environments to which radiation thermometers are exposed.

SUMMARY OF THE INVENTION

In accordance with the present invention, a radiation thermometer assembly comprises a radiation thermometer for detecting radiation and for generating at a first terminal an electrical output signal representative of the detected radiation; a cap assembly comprising a housing carrying a second terminal to which a cable can be connected, and means for electrically coupling the first and second terminals; and securing means for removably securing the cap assembly directly or indirectly to the radiation thermometer.

This aspect of the invention enables a user very quickly and easily to fit a cable connected to a processor or the like to the radiation thermometer. He simply attaches the cable to the second terminal of the cap and then mounts the cap assembly to the thermometer. No wire connections by the user to a demountable connector or the like are necessary, these typically requiring soldering.

The cap assembly may be secured directly on the thermometer. Typically, however, the thermometer is provided with a protective jacket and/or is supported by mounting means, the cap assembly being secured to the thermometer protective jacket or mounting means.

The securing means could be provided by any suitable securing system but is preferably some form of quick release mechanism. For example, the use of an over centre catch is preferred.

The cap assembly housing could take a variety of forms but preferably the part of the cap assembly housing which is attached to the radiation thermometer matches the shape of the adjacent part of the radiation thermometer. Not only does this mean that the assembled components look attractive but it enables the cap assembly easily to be mounted.

Usually, the first terminal will be provided at the rear of the radiation thermometer, typically as a quickly demountable connector (e.g. screw-on, push-on or bayonet fitting). Usually the second terminal will be provided at the rear of the cap and will be of a type using screw or spring clip terminals to secure and connect the individual wires.

In some cases, the cap assembly housing will define a single chamber through which extends an electrical wire or other coupling to define the means for electrically coupling the first and second terminals. In the preferred example, however, the cap assembly housing has two chambers, an inner chamber containing the means for electrically coupling the first and second terminals (e.g. a wire), and an outer chamber containing the second terminal, attached to the means for electrically coupling the first and second terminals through an aperture in a wall separating the chambers, the second chamber including a further aperture through which the second terminal is connected to a cable. This is particularly useful in areas of very high electro-magnetic interference (EMI) as the "screening" can be maintained over the entire cable and connectors while filters may be positioned between the two chambers.

Preferably, the second chamber has a removable lid to enable access to be gained to the second chamber while the first chamber remains closed to the atmosphere thus protecting the radiation thermometer. This also allows a cable to be connected to the second terminal.

The invention is particularly suited for use with infrared thermometers but could also be used with other types of radiation thermometer of known construction.

BRIEF DESCRIPTION OF THE DRAWINGS

An example of an infrared thermometer assembly according to the present invention will now be described with reference to the accompanying drawings, in which.

DETAILED DESCRIPTION OF THE EMBODIMENT

Figure 1:
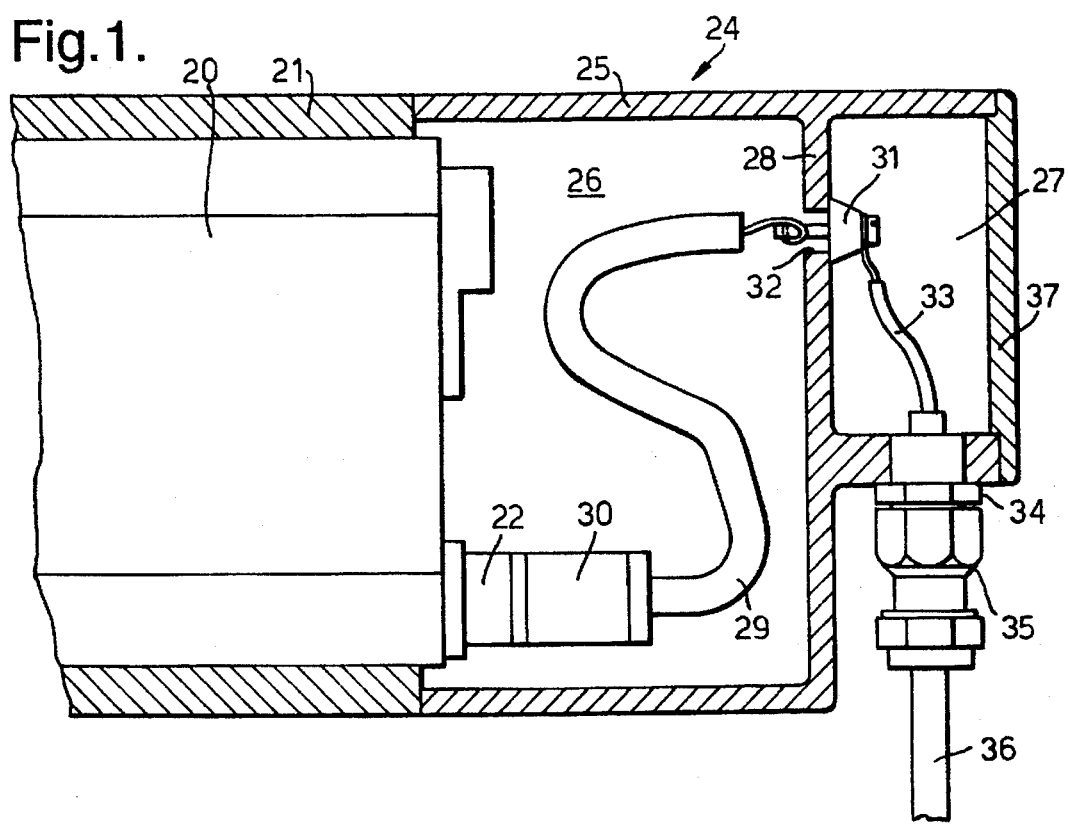
FIGS. 1 and 2 are a longitudinal section and side elevation respectively.
Figure 2:
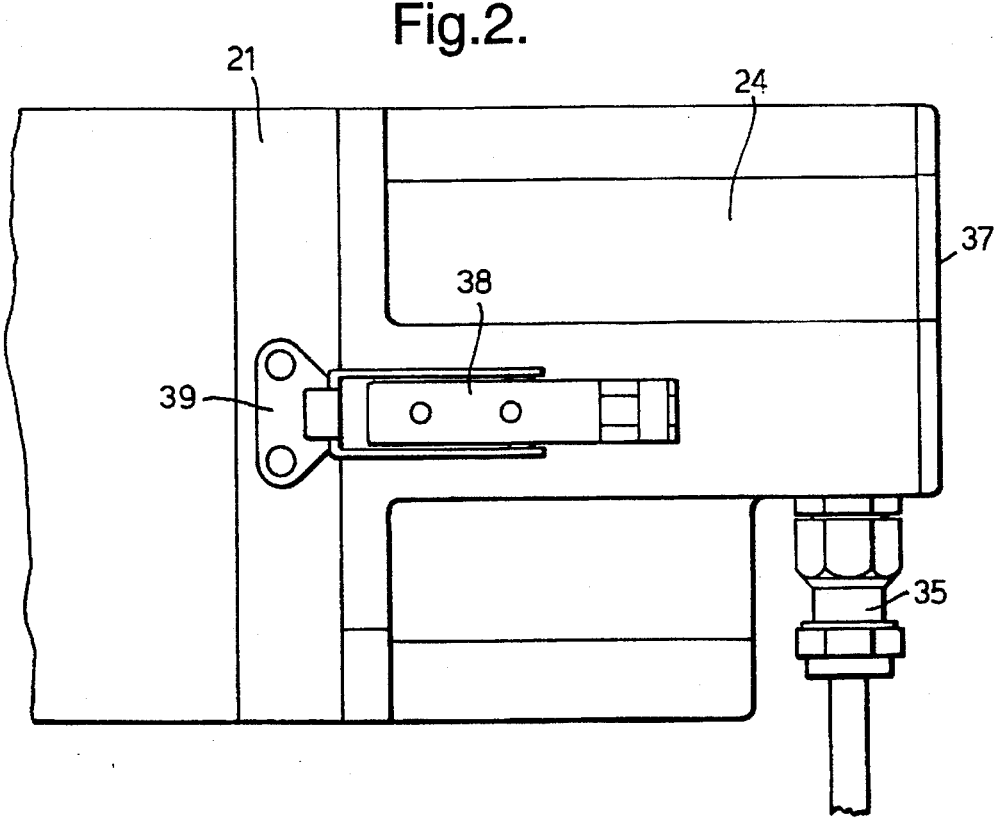

FIGS. 1 and 2 illustrate the rear end of an infrared thermometer 20 of conventional form removably positioned in a protective jacket 21. An output terminal 22, at which a signal representing a monitored temperature is output, is mounted to the thermometer 20.

A cap assembly 24 including a housing 25 is mounted to the jacket 21. As can be seen in FIG. 1, the housing 25 defines two chambers 26,27 separated by a wall 28. The chamber 26 includes a flying lead 29 connected at one end to a demountable connector 30 which is fitted in use (for example as a plug and socket connection) to the terminal 22. The other end of the flying lead 29 is connected to a terminal strip 31 part of which extends through an aperture 32 in the wall 28. The other side of the terminal strip 31 extends into the chamber 27 and provides a convenient screw terminal connection for wires 33 of a cable 36 which exits the chamber 27 via a cable gland 35 secured to a wall of the chamber 27 by a lock nut 34. The cable 36 will normally be connected to a remote processor for indicating the temperature being detected by the thermometer. A lid 37 is provided to allow access to the chamber 27, the lid being screwed or otherwise secured to the wall of the chamber.

The cap assembly 24 is secured to the jacket 21 by an over centre catch 38 mounted to the cap housing 25 and secured by clip hook 39 to the jacket 21 (FIG. 2).

It will be appreciated that in use the cap assembly 24 provides a very convenient method for connecting a cable 36 to the thermometer 20. The cap assembly is preformed and prewired, providing the demountable connector 30 at one end and the terminal strip 31 at the other connected by the lead 29 at manufacture. The user then connects the cable 36, usually only once, to the terminal strip 31 using only hand tools in a convenient environment typically remote from where the thermometer is finally located. The lid 37 is then secured. The user then makes the final connection to the thermometer (e.g. on top of a furnace) quickly and needing no tools simply by attaching (e.g. push fitting) the connector 30 to the terminal 22 and clipping the housing or cap 25 to the thermometer housing 21. In a similar fashion, the thermometer can be quickly removed with no tools for e.g. a calibration check. Thus, once made, this connection need not be disturbed in order to remove the thermometer 20 from its installed position typically in a mounting or protective jacket 21. The electrical connection can be quickly and conveniently broken and re-made using the demountable connector 30 and its mating part 22 on the thermometer 20.

As mentioned above, although two separate chambers 26,27 are not essential, the use of a separate chamber 27 is helpful in areas of very high EMI.

We claim:

1. A radiation thermometer assembly comprising a radiation thermometer for detecting radiation and for generating at a first terminal an electrical output signal representative of the detected radiation; a cap assembly comprising a housing carrying a second terminal to which a cable can be removably connected, a demountable connector for attachment to the first terminal and a lead for electrically coupling the demountable connector and the second terminal, said electrical output signal being conveyed directly to said cable via said lead and said second terminal; and securing means for removably securing said cap assembly housing directly or indirectly to the radiation thermometer.

2. An assembly according to claim 1, wherein said securing means comprises an over centre catch.

3. An assembly according to claim 1, wherein the part of said cap assembly housing which is secured to said radiation thermometer matches the shape of the adjacent part of the radiation thermometer.

4. An assembly according to claim 1, wherein said cap assembly housing has two chambers, an inner chamber containing said demountable connector, and an outer chamber containing said second terminal attached to said demountable connector through an aperture in a wall separating the chambers, said outer chamber including a further aperture through which said second terminal is connected to a cable.

5. An assembly according to claim 4, wherein said outer chamber has a removable lid to enable access to be gained to said outer chamber while said inner chamber remains closed to the atmosphere thus protecting the radiation thermometer.

6. An assembly according to claim 1, wherein said demountable connector and said first terminal define a plug and socket connection.

7. An assembly according to claim 1, wherein said second terminal is a terminal strip for individual wire connections.

8. An assembly according to claim 1, wherein said second terminal is a screw connector.

9. An assembly according to claim 1, further comprising a thermometer housing to which said radiation thermometer is removably attached, said cap assembly being removably secured by said securing means to said thermometer housing.

10. An assembly according to claim 9, wherein said cap assembly housing butts against said thermometer housing.

11. An assembly according to claim 1, wherein said lead is a flying lead.

* * * * *